Patented Jan. 14, 1930

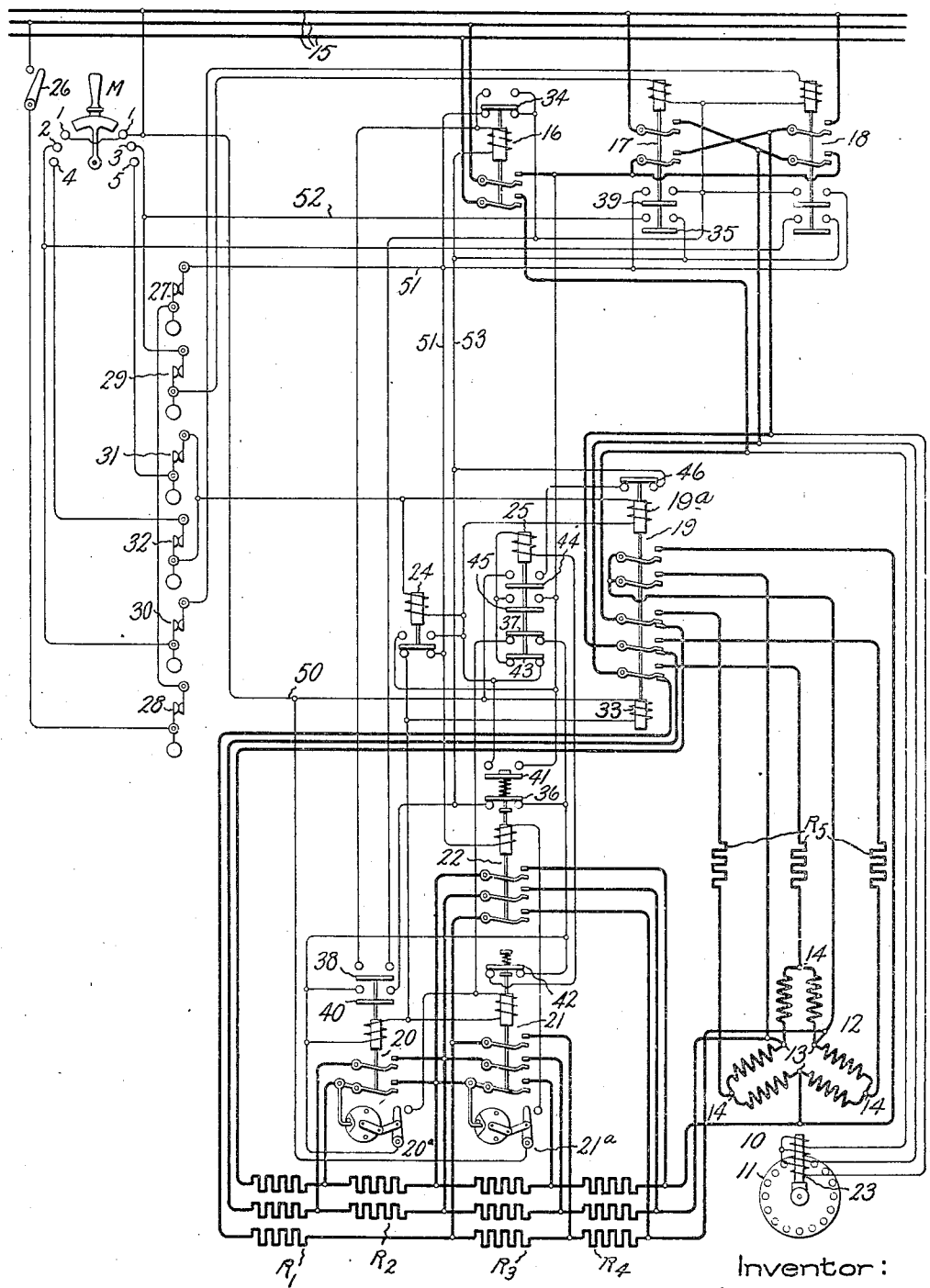

1,743,760

UNITED STATES PATENT OFFICE

JOHN EATON, OF SCHENECTADY, NEW YORK, ASSIGNOR TO GENERAL ELECTRIC COMPANY, A CORPORATION OF NEW YORK

MOTOR-CONTROL SYSTEM

Application filed May 15, 1926. Serial No. 109,392.

The invention relates to the control of electric motors, particularly multispeed motors suitable for elevator service and adapted for regenerative braking. More specifically, the invention provides an improved control system and apparatus for multi-speed motors that are adapted to exert a regenerative braking action when the low speed power connections for the motor are established after operation of the motor at a higher speed.

With most all multispeed motors of the above type, and especially with an alternating current induction motor provided with multispeed windings the braking action obtained upon establishment of the low speed power connections for the motor with the motor operating at a higher speed varies greatly in value, depending upon the excess of the operating speed of the motor above the synchronous speed of the low speed windings. When such motors are employed in passenger elevator service it is desirable to obtain a fairly uniform braking action upon establishing the low speed power connections for the motor after operation thereof at higher speed in order to avoid an abrupt change in the speed of the elevator car with resulting discomfort to the passengers. Ordinarily considerable difficulty is encountered in obtaining a smooth and satisfactory deceleration of the elevator car on account of the wide variation in the braking action of the motor. Thus, if the control apparatus is adjusted to obtain a proper and satisfactory braking action when the low speed power connections are established with the motor operating at the full high speed, a braking action of excessive value may be exerted by the motor when the low speed power connections are established with the motor operating at a speed intermediate the low and the high speeds. In many cases the braking action at the intermediate speed may be many times the value of that obtained with the motor running at high speed. This is particularly true when resistance is inserted in circuit with the low speed windings of the two-speed induction motor to control the braking torque and is due to the fact that the maximum braking torque of the motor is dependent upon both the rotor slip and the value of resistance in the primary circuit. Hence, it is entirely possible that with a given value of resistance inserted in the circuit the braking torque at an intermediate slip speed of the motor will be many times the torque obtained with the motor running at a higher slip speed. Thus, when the braking connections are established with the motor running at the intermediate speed, this results in imposing a severe braking jar or jolt upon the elevator car that is very undesirable from the standpoint of the passengers and, furthermore may impose undue strains on the driving mechanism.

One of the principal objects of the present invention is to provide a control system that automatically limits the braking action of the motor when the low speed power connections thereof are established when the motor is operating at the intermediate or excessive braking torque speed while permitting full normal braking action of the motor at the high speed. Furthermore, my improved control system permits full motoring torque of the motor to be obtained at all times, and the braking torque of the motor is limited only when the low speed braking connections are established before the motor has sufficient time to accelerate to the full high speed.

Briefly, in carrying my invention into effect in the preferred form of control for a two-speed alternating current induction motor, I provide a resistor that is normally ineffective to limit the torque of the motor upon establishment of low speed power connections thereof for either motoring or braking operation. However, my improved controlling apparatus for the motor is arranged to automatically render the resistance effective when the low speed motor connections are established before or a certain time interval after the establishment of the high speed motor connections. Thus, the torque limiting resistor is maintained effective only when the low speed motor connections are established within a predetermined time interval after the power connections are shifted from the low speed operating connections to the high speed operating connections of the motor.

This effectively prevents the motor from exerting an excessive braking torque before the motor is fully accelerated to the full high operating speed and thereby insures that the load driven by the motor is decelerated smoothly and gradually and without an abrupt jar or jolt under all operating conditions.

A better understanding of the invention may be had from the accompanying drawing in which the single figure is a schematic control diagram showing a control system for a two-speed alternating current induction motor embodying a preferred form of the invention adapted for elevator service.

Referring to the drawing, the motor 10 is shown as of the two-speed alternating current induction type having a squirrel cage rotor 11 and the stator windings 12. The stator windings 12 are arranged in a well-known manner to produce one number of poles when power is supplied to the windings through the low speed connections 13 and a different number of poles when power is supplied to the motor through the high speed connections 14. For example, the windings 12 may be arranged to produce 16 poles when the low speed power connections are established and 8 poles when the high speed power connections are established. This causes the squirrel cage rotor 11 to be operated at a definite low speed and also at a definite high speed, although it will be understood that my invention is not limited to the particular form of motor illustrated and may be applied with equal advantage to other forms of multi-speed electric motors.

In the control system illustrated power is supplied to the motor 10 from the three phase alternating current supply lines 15 to an electroresponsive line switch 16 and one of the reversing switches 17 and 18. The speed-selective switch 19 is biased to the position in which it is shown so as to establish the low speed power connections for the motor with the resistors $R_1$, $R_2$, $R_3$ and $R_4$ in the low speed motor connections and is arranged when operated to its upper position to establish the high speed motor connections with the resistors $R_5$ in the motor circuit.

The stabilizing resistor $R_1$ always remains in the low speed motor power circuit. The protective resistor $R_2$ is designed to have a relatively large value of resistance sufficient to materially limit the torque that can be exerted by the motor 10 during both motoring and braking operation while the accelerating resistors $R_3$ and $R_4$ are of suitable value to regulate the normal acceleration and deceleration of the motor 10. The resistors $R_2$, $R_3$ and $R_4$ are controlled respectively by the electromagnetic switches 20, 21 and 22.

The operation of the line switch 16 and the reversing switches 17 and 18, together with the speed-selective switch 19 and the resistance controlling switches 20, 21 and 22 is under the control of the master switch or controller M. As will be more fully set forth in connection with the operation of my control system, the interconnection of the several electromagnetic switches with the master switch are such that the electromagnetic brake 23 is released and low speed operation of motor 10 in one direction, for example, the up direction of the elevator, is obtained upon operation of the master switch to bridge the contacts 1 and 3, and high speed operation of the elevator in the up direction is obtained when the master switch is advanced to bridge the contacts 1 and 5.

Likewise, low and high speed operation of the motor 10 is obtained in the reverse or down direction of the elevator when the master switch M bridges the contacts 1 and 2, and 1 and 4 respectively.

The electroresponsive relays 24 and 25, in co-operation with the time element device $21^a$, automatically control the establishment of an energizing circuit for the line switch 16 and one of the reversing switches independent of the master and switch M to insure the establishment of the low speed motor connections for regenerative braking operation of the motor for a predetermined time interval after interruption of the high speed power connections. These relays and the time element device $21^a$ also function in co-operation with switch 20 to insure that the relatively high resistance $R_2$ is maintained inserted in the low speed motor connections in case the low speed power connections are established within a predetermined time interval after the establishment of the high speed connections sufficient to permit the motor to accelerate to full high running speed. This avoids imposing shocks or jars upon the driving equipment of the elevator with resulting discomfort to the occupants in case the low speed braking connections are established before the motor has had time to fully accelerate to high running speed. The time element devices $20^a$ and $21^a$ are of the form claimed in an application of mine, Serial No. 109,391 filed May 15, 1926.

The detailed operation of the control system illustrated is as follows: With the alternating current supply lines 15 energized from a suitable source and the control emergency switch 26 in the closed position operation of the motor 10 to drive the elevator in the "up" direction at low speed results from operation of the master controller M to bridge its contacts 1 and 3. This establishes an energizing circuit for the operating winding of reversing switch 17 extending from the upper supply line through the master switch contacts 1 and 3, the up slowdown switch 29, the winding of reversing switch 17, and thence through the auxiliary contact 34 with which line switch 16 is provided, thence through the conductor 51, the upper stop limit switch 27, the lower stop limit switch 28 and the emergency switch 26, to the middle supply line 15. Upon the response of reversing switch 17 the operating winding of the controlling switch 20 for the high resistance $R_2$ is energized through a circuit extending from the master switch contact 3 through the conductor 52, the auxiliary contact 35 on the reversing switch 17, the conductor 53, contact 36 on the resistance controlling switch 22, the winding of resistance controlling switch 20, the contact of relay 24 in its lower position, thence through the conductor 51 to the middle supply line 15.

At the same time the operating winding of resistance controlling switch 21 is energized in parallel with the winding of switch 20 through a circuit extending through the contact 37 of relay 25 and switches 20 and 21 respond to short circuit the resistors $R_2$ and $R_3$ respectively to permit a ready response of motor 10 upon establishment of the low speed power connections. As soon as switch 20 responds to short circuit the high resistance $R_2$, an energizing circuit for the operating winding of line switch 16 is completed by the auxiliary contact 38, the circuit extending from the conductor 52 through the auxiliary contact 35 on the reversing switch 17, the winding of switch 16, contact 38, contact 39 and conductor 51.

When the line switch 16 closes the electromagnetic brake 23 is released and the low speed power connections for operating the motor in the "up" direction are established through the speed selective switch 19 with the resistors $R_1$ and $R_4$ in the motor circuit. Since the high resistor $R_2$, as well as the resistor $R_3$, is shunted from the motor circuit the motor 10 is capable of exerting a full accelerating torque to start the elevator.

It should be noted that when the high resistance controlling switch 20 closes, the auxiliary contact 40 thereof establishes a circuit for holding the switch 20 closed independently of the contact 36 on the resistance controlling switch 22. At the same time, the fly wheel time element switch $20^a$ is set into operation preparatory to establishing a holding circuit for the switch 21 in shunt with contact 37 of relay 25. Also, when the line switch 16 closes the auxiliary contact 34 thereof completes an energizing circuit for the operating winding thereof independently of the contact 38 on switch 20.

When the motor 10 has started the elevator in the "up" direction and a sufficient time interval has elapsed to permit the fly wheel time element switch $21^a$ to operate, the winding of switch 22 is energized through a circuit including the conductors 50 and 51 and the switch 22 closes to short circuit the resistor $R_4$, as well as the resistor $R_3$, and thereby accelerate the motor 10 to the full low running speed with only the stabilizing resistor $R_1$ in the motor power connections.

To initiate operation of the motor 10 at high speed the master switch is advanced to connect the contact 5 with contact 1. This results in the establishment of an energizing circuit for the operating windings of both the relay 24 and the speed-selective switch 19, the circuit extending from the upper supply line 15 through the master switch contacts 1 to 5, the high speed slowdown switch 31, the relay 24 and winding $19^a$ in parallel circuit, and the auxiliary contact 41 of switch 22, and thence directly through the line switch 16 to the middle supply line 15. The speed-selective switch 19 remains in the position in which it is shown until the relay 24 operates to interrupt the energizing circuit of the holding winding 33. This permits the operating winding $19^a$ to function and operate the switch 19 to interrupt the low speed power connections of motor 10 and establish the high speed power connections therefor through the high speed stabilizing resistors $R_5$. Motor 10 at once starts to accelerate the load to the full high running speed, the resistors $R_5$ serving to insure a smooth and gradual acceleration thereof.

Upon operation of relay 24 the energizing circuits of the resistance controlling switches 20 and 21 are interrupted simultaneously with the interruption of the circuit of the holding winding 33 of the speed-selective switch. The relay 24 also closes a holding circuit for the operating winding $19^a$ of the speed-selective switch, as well as its own operating winding, independently of the contact 41 on the switch 22. However, switch 22 remains energized with its resistance controlling contacts closed for the time interval required for the fly wheel time element device $21^a$ to open its contact after the deenergization and return of the switch 21 to the position in which it is shown.

In this way the deenergization of the switch 22 is delayed for a time interval after the change-over from the low speed to the high speed motor connection sufficient to permit the motor 10 to accelerate the elevator car to substantially the full high running speed. Since the contact 36 of switch 22 controls the reenergization of the high resistance controlling switch 20, the latter is maintained in its open position to insert the high resistance $R_2$ in the low speed motor connections during the time required for the motor to accelerate from the low speed to the full high running speed. Thus, in case the operator for any reason should return the master switch to the low speed position before the motor 10 has reached the full high running speed, the high resistance $R_2$ is maintained in the low speed power circuit of the motor to prevent the motor from exerting an excessive braking torque.

The operation of the control system when the master switch controller M is returned to the low speed position before the motor has had sufficient time to accelerate the load from the lower operating speed to the full high running speed, is as follows: When the master switch leaves contact 5, the relay 24 and the operating winding 19$^a$ of the speed-selective switch are deenergized and each at once returns to the position in which it is shown. This results in establishing the low speed connections with the high resistance R$_2$ in circuit to limit the braking action of motor 10 even though the switch 22 remains closed and thereby maintains resistances R$_3$, R$_4$ short circuited. When the time element device 21$^a$ finally responds to the deenergization of the operating winding of switch 21 in the manner described above and finally opens the energizing circuit of switch 22, the latter then operates to remove the short circuit from the resistors R$_3$ and R$_4$ and at the same time complete energizing circuits for the operating windings of switches 20 and 21 through the contact 36, the latter circuits including the conductors 52 and 53, the contact 36 of switch 22, the operating winding of switch 20 and the winding of switch 21 in parallel through the contact 37 of relay 25, the contact of relay 24 in its lower portion, and the conductor 51. Switches 20 and 21 are thus energized after the initial braking action of motor 10 has had an opportunity to reduce the motor speed to such value that the braking torque thereof with the resistors R$_2$ in the circuit no longer is of an excessive value. Hence, when the switches 20 and 21 respond to remove the torque limiting resistors R$_2$ and resistors R$_3$ from the low speed power connections, the resistors R$_4$ and R$_1$ which is permanently connected in the low speed connections are capable of maintaining the braking torque of the motor 10 within suitable limits. As the braking effect of motor 10 further reduces the speed, the time element device 21$^a$ operates to energize the switch 22 and the latter responds to short circuit the resistors R$_3$ which has already been short circuited by switch 21 and resistor R$_4$. As these operations are successively accomplished the braking action of the motor 10 reduces the motor speed to substantially the low running speed without jar or jolt due to excessive braking action.

In case the master controller M is thrown to the off position instead of to the low speed position before the motor has fully accelerated to the high speed after the changeover from the low speed windings to the high speed windings, the control system operates to interrupt all power connections to the motor and immediately apply the electro-magnetic brake 23. This is due to the fact that during the period the resistance controlling switch 22 is maintained energized through the time element inter-lock 21$^a$ after establishment of the high speed motor connections, the relay 25 is maintained energized. This is due to the fact that the energizing circuit for relay 25 extends through the contact 36 on the resistance controlling switch 22. As will be set forth more in detail hereinafter, the relay 25 serves to establish an energizing circuit for the line switch 16 and the reversing switch 17 independent of the master controller M. Hence, upon the return of the master controller M to the off position during the period the switch 22 is maintained energized and the relay 25 is maintained deenergized there is no independent holding circuit for the line switch or the reversing switch. Consequently, these switches open and disconnect the motor 10 and the windings of electromagnetic brake 23 from the supply lines 15. This results in the application of the electromagnetic brake to bring the motor 10 to rest.

However, when the master controller M is not operated to the off position or to reestablish the low speed connections for the motor before the motor has had time to accelerate from the low operating speed to the full high running speed, as just previously assumed, the operation of the control system is as follows: After the time interval required for the motor to accelerate the load to the full high running speed has elapsed the time element device 21$^a$ finally responds to the deenergization of switch 21 and functions to interrupt the energizing circuit of the operating winding of switch 22.

The latter at once opens the short circuit around the resistors R$_3$ and R$_4$ and closes its contact 36 preparatory to establishing an energizing circuit for the switch 20 immediately upon the reestablishment of the low speed motor connections. The closure of contact 36 also completes an energizing circuit for the operating windings of relay 25 extending from the conductor 53, through the contact 36, the contact 42 of switch 21, the operating windings of relay 25, contact 43 with which the relay 25 is provided, thence through the upper contacts of relay 24 and the line switch 16 to the middle conductor 15. Relay 25 at once responds to close its contacts 44 and 45 and open the contacts 43 and 37. Closure of contact 45 establishes a holding circuit for the operating windings of relay 25 independent of the contacts of the relay 24, and including, however, the contact 36 of switch 22 and the contact 42 of the switch 21. Thus the deenergization of relay 25 is placed under the control of the resistance controlling switch 21.

The closure of contact 44 of relay 25 partially completes a holding circuit for maintaining the windings of the line switch 16 and the reversing switch 17 energizes independently of the master controller M, when the circuit is finally completed by the reclosure of contact 46 of the speed change switch 19. This insures that when speed change switch 19 is returned to the low speed position, the low speed motor power connections are automatically maintained established for a predetermined time interval irrespective of the operation of the master control M to the off position or even to one of the "down" positions. This is accomplished in the following manner.

With the motor 10 operating at the full high speed, let us assume that the master control M is thrown to the off position. This at once interrupts the circuit through which the operating windings of the relay 24 and the speed change switch 19 are energized, and both the relay and the speed change switch immediately return to their respective biased positions in which they are shown. The relay 24 at once establishes an energized circuit for the resistance controlling switch 20 extending through contact 36, and the switch 20 responds to short circuit the high resistance $R^2$. Thus upon the reestablishment of the low speed motor connection for the switch 19 only the resistances $R_1$, $R_3$, $R_4$ are inserted in the motor circuit, thereby permitting the motor 10 to exert its full normal dynamic braking torque to retard the speed of the elevator driven by the motor.

As previously pointed out, the line switch 16 and the reversing switch 17 are maintained energized independently of the master controller M through the independent holding circuit established upon the closure of contact 46 of the speed changing switch 19. In this way the motor low speed power connections are maintained established automatically to permit the dynamic braking action of motor 10 to retard the load driven thereby.

When the switch 20 closes to short circuit the resistor $R_2$ the time element device $20^a$ is set into operation to complete an energizing circuit for the switch 21 after the elapse of a predetermined time interval. Thus after the full braking action of motor 10 has persisted for a sufficient interval to reduce the speed of the motor to substantially the synchronous speed of the low speed motor windings, the time element device $20^a$ functions to complete the energizing circuit of switch 21. The latter responds and opens the contact 42. This interrupts the energizing circuit of the relay 25 and the latter in turn returns to the position in which it is shown and thereby interrupts the holding circuit through which the line switch 16, as well as the reversing switch 17 is maintained energized. The resulting opening of the line switch 16 and the reversing switch 17 interrupts the low speed power connections of motor 10 and also of the electromagnetic brake 23. Thereupon the electromagnetic brake 23 is applied to bring the motor 10 and the load driven thereby to rest.

The operation of the motor 10 to drive the elevator in the "down" direction at slow and high speed is accomplished in substantially the same manner as that already described upon operation of master switch M to engage its contacts 2 and 4 and hence need not be described in detail. Likewise, the operation of the relays 24 and 25 to effect the automatic establishment of the low speed motor connection after the operation thereof at high speed in the "down" direction is the same as that occurring during operation in the "up" direction. Furthermore, the resistance controlling switch 22 is automatically maintained energized for a predetermined time interval after the change from the low speed motor connections to the high speed motor connections, in order to prevent energization of the switch 20 and thereby insure that the torque limiting resistor $R_2$ is maintained inserted in the low speed motor power connections until after the motor has accelerated to full high running speed. This serves to limit the brake torque of the motor in case the low speed power connections are established within a certain time interval after the establishment of the high speed motor connections in identically the same way as described in connection with the operation of the motor 10 in the "up" direction.

From the foregoing it will be evident that my invention provides an improved arrangement of control apparatus and circuits whereby the low speed braking torque of a multispeed motor is automatically limited within suitable and satisfactory values under all conditions of operation.

While I have illustrated and described a preferred embodiment of the invention, it will be understood that the arrangement shown may be varied considerably without departing from the spirit and scope of the invention.

What I claim as new and desire to secure by Letters Patent of the United States, is:

1. In a motor control system the combination of an electric motor arranged to be operated at a plurality of definite speeds, switch mechanism for establishing a low speed power connection to electrically brake the motor after operation thereof at a higher speed, means for regulating the braking torque of the motor, and means for modifying the action of said torque-regulating means to limit the braking torque of the motor only when said switch mechanism is operated to establish the low speed power connections of the motor before the motor has accelerated to the higher speed.

2. In a motor control system, the combination of an electric motor arranged to be operated at a plurality of definite speeds, switch mechanism for establishing power connections to operate the motor at each of said speeds and arranged to establish the low speed power connections to electrically brake the motor after operation thereof at a higher speed, means for regulating the braking torque of the motor, and means set into operation upon the establishment of the higher speed power connections of the motor for controlling said torque-regulating means to limit the braking torque of the motor to a predetermined value when said switching mechanism is operated to shift from high speed motor power connections to low speed motor power connections with the motor operating at full speed, and to substantially the same value when said switch mechanism is operated to shift from the high speed motor power connections to the low speed motor power connections with the motor operating at an intermediate speed.

3. In a motor control system, the combination of an electric motor arranged to be operated at a plurality of definite speeds, switch mechanism for establishing a low speed power connection to electrically brake the motor after operation thereof at a higher speed, and means including a time element device for limiting the value of the motor braking torque to a predetermined value upon operation of said switch mechanism to establish the slow speed power connections of the motor a predetermined time interval after the establishment of the high speed connections, and to substantially the same value upon operation of the said switch mechanism to establish the slow speed power connections of the motor within said predetermined time interval after the establishment of the higher speed connections for the motor.

4. In a motor control system, the combination of an electric motor arranged to be operated at a plurality of definite speeds, switch mechanism for automatically establishing a low speed power connection to electrically brake the motor after operation thereof at a higher speed, a resistor in the low speed connection for regulating the braking torque of the motor, means for rendering said resistor ineffective to limit the motoring torque of said motor and electro-responsive time element means for controlling said resistor to prevent operation of the motor with full braking torque only when said switch mechanism is operated to establish the low speed power connections for the motor within a predetermined time interval after the establishment of the higher speed motor connections.

5. In a motor control system, the combination of an electric motor arranged to be operated at a plurality of definite speeds, switch mechanism for establishing power connections to operate the motor at each of said speeds and arranged to establish the low speed power connections to electrically brake the motor after operation thereof at a higher speed, and automatic time element means for controlling the motor torque and arranged to insure operation thereof with limited braking torque when the low speed power connections are established within a predetermined time interval after the establishment of the high speed motor connections and to insure operation of the motor with full braking torque when the low speed power connections are established a greater time interval after the establishment of the high speed motor connections.

6. In a motor control system, the combination with a motor adapted to be operated at a plurality of definite speeds, of switch mechanism for establishing the low speed power conections of the motor before and after establishment of the high speed power connections therefor, a resistor for limiting the low speed torque of the motor, and an electro-responsive time element circuit controlling device associated with said switch mechanism for rendering said resistor ineffective upon the establishment of the low speed power connections for the motor before and a certain time interval after the establishment of the high speed motor connections.

7. In a motor control system, the combination of an alternating current motor having low speed and high speed connections, a resistor connected in the low speed power connections of the motor for limiting the torque thereof, switch mechanism for establishing the low speed power connections of the motor and short circuiting said resistor before establishment of the low speed motoring connections therefor and after establishment of low speed braking connections, and time element means cooperating with said switch mechanism for delaying the short circuiting of said resistor when the low speed power connections are established within a predetermined time interval after establishment of the high speed power connections of the motor.

8. In a motor control system, the combination of an electric motor arranged to be operated at a plurality of definite speeds, switch mechanism for establishing power connections to operate the motor at each of said speeds and arranged to establish the low speed power connections to electrically brake the motor after operation thereof at a higher speed, a resistor for limiting the low speed torque of the motor, and automatic time element means controlled by said switch mechanism for rendering said resistor ineffective to limit the motoring torque when the low speed motor connections are initially established, and for rendering said resistor effective to limit the braking torque when the low speed motor connections are established within a certain time interval after the establishment of the high speed connections.

9. In a motor control system, the combination of an alternating current motor having low speed and high speed windings, of switch mechanism for establishing power connections to operate the motor at each of said speeds and arranged to automatically establish the low speed power connections to electrically brake the motor after operation of the motor at high speed, a resistor connected in the low speed power connections of the motor for regulating the operating torque thereof, and an automatic time element circuit controlling device cooperating with said switch mechanism to render said resistor ineffective when the low speed power connections of the motor are initially established and when the low speed motor connections are established a predetermined time interval after the establishment of the high speed motor connections and for rendering said resistor effective to limit the braking torque of the motor when the low speed motor connections are established during said predetermined time interval.

10. In a motor control system, the combination of an alternating current motor having low speed and high speed windings, of electroresponsive switch mechanism for controlling the connection of said windings to a source of supply, a master switch for controlling said electroresponsive switches to selectively operate the motor at low and at high speed, a resistor connected in the low speed circuit of the motor for regulating the operating torque thereof, an electroresponsive switch for controlling said resistor, an automatic electroresponsive time element means cooperating with said controller to control the energization of said resistance controlling switch to render said resistor ineffective before the slow speed power connections of the motor are initially established and when the low speed motor connections are established a predetermined time interval after the establishment of the high speed motor connections, and automatic electroresponsive time element means cooperating with said controller to control the energization of said resistance controlling switch to render said resistor effective to limit the braking torque of the motor when the low speed motor connections are established during said predetermined time interval and for automatically insuring the establishment of the low speed motor connections with said resistor ineffective and upon subsequent operation of the master controller to the off position.

11. In a motor control system, the combination of an alternating current motor having low speed and high speed connections, a resistor connected in the low speed power connections of the motor for limiting the torque thereof, switch mechanism for establishing low speed power connections to decelerate said motor, and for short circuiting and thereafter maintaining a short circuit about said resistor during the deceleration of said motor, and time element means cooperating with said switch mechanism for delaying the short circuiting of said resistor for a predetermined interval of time after the establishment of the high speed power connections.

12. In a motor control system the combination of an electric motor having low speed and high speed power connections, means for establishing low speed connections for said motor after operation thereof at a higher speed, and means in the low speed power connections effective to limit the braking torque of the motor when slow speed connections are reestablished after establishment of the high speed power connections but before the motor has accelerated to high speed and means for rendering said means ineffective to limit the motoring torque.

In witness whereof, I have hereunto set my hand this 14th day of May, 1926.

JOHN EATON.

CERTIFICATE OF CORRECTION.

Patent No. 1,743,760.                                                    Granted January 14, 1930, to

JOHN EATON.

It is hereby certified that error appears in the printed specification of the above numbered patent requiring correction as follows: Page 4, line 32, for the word "portion" read "position"; and line 70, for the word "energized" read "de-energized"; and that the said Letters Patent should be read with these corrections therein that the same may conform to the record of the case in the Patent Office.

Signed and sealed this 18th day of February, A. D. 1930.

(Seal)                                                              M. J. Moore,
Acting Commissioner of Patents.